(12) United States Patent
Mercier et al.

(10) Patent No.: US 11,050,612 B2
(45) Date of Patent: Jun. 29, 2021

(54) AUTHORIZATION OF CLOUD-MANAGED NETWORK DEVICES

(71) Applicant: HEWLETT PACKARD ENTERPRISE DEVELOPMENT LP, Houston, TX (US)

(72) Inventors: Mathieu Mercier, Laval (CA); Robert Gagnon, St. Laurent (CA); Guy Letourneau, Boucherville (CA); Stephane Laroche, St. Laurent (CA)

(73) Assignee: Hewlett Packard Enterprise Development LP, Houston, TX (US)

( * ) Notice: Subject to any disclaimer, the term of this patent is extended or adjusted under 35 U.S.C. 154(b) by 59 days.

(21) Appl. No.: 16/274,327

(22) Filed: Feb. 13, 2019

(65) Prior Publication Data
US 2020/0259705 A1    Aug. 13, 2020

(51) Int. Cl.
| | | |
|---|---|---|
| *H04L 12/24* | (2006.01) | |
| *H04W 60/00* | (2009.01) | |
| *H04W 12/062* | (2021.01) | |
| *H04W 8/00* | (2009.01) | |
| *H04L 29/06* | (2006.01) | |
| *H04W 84/18* | (2009.01) | |

(52) U.S. Cl.
CPC .......... *H04L 41/0803* (2013.01); *H04L 63/08* (2013.01); *H04W 8/005* (2013.01); *H04W 12/062* (2021.01); *H04W 60/00* (2013.01); *H04W 84/18* (2013.01)

(58) Field of Classification Search
CPC ............................... H04L 63/08; H04W 8/005
See application file for complete search history.

(56) References Cited

U.S. PATENT DOCUMENTS

| | | | |
|---|---|---|---|
| 7,697,516 B2 | 4/2010 | Frei et al. | |
| 7,965,842 B2 | 6/2011 | Whelan et al. | |
| 8,060,592 B1 * | 11/2011 | Watsen | H04L 41/085 709/223 |
| 8,584,942 B1 * | 11/2013 | Rayes | G06K 19/00 235/385 |

(Continued)

FOREIGN PATENT DOCUMENTS

| | | |
|---|---|---|
| WO | WO-2010076495 | 7/2010 |
| WO | WO-2017161361 | 9/2017 |

OTHER PUBLICATIONS

Cloud Managed Technologies, (Web Page), Retrieved Oct. 19, 2018, 5 Pgs., https://www.mojonetworks.com/products/cognitive-cloud-wifi/2-wireless.

*Primary Examiner* — Lashonda T Jacobs
(74) *Attorney, Agent, or Firm* — McDermott Will & Emery

(57) ABSTRACT

A network management system may receive, via a wide area network (WAN), a request to register a pending network device with an entity. The network management system may, in response to receiving the request to register the pending network device with the entity, determine whether the pending network device is able to communicate, via a local area network (LAN) associated with the entity, with a registered network device that is already registered with the entity. The network management system may, in response to at least determining that the pending network device is able to communicate via the LAN with the registered network device, register the pending network device with the entity.

20 Claims, 8 Drawing Sheets

(56) References Cited

U.S. PATENT DOCUMENTS

| | | | |
|---|---|---|---|
| 8,917,671 B2 | 12/2014 | Jing et al. | |
| 9,232,451 B2 | 1/2016 | Murphy et al. | |
| 10,375,045 B2* | 8/2019 | Schatzmann | H04L 41/0816 |
| 2008/0075010 A1* | 3/2008 | Song | H04W 40/02 370/238 |
| 2009/0043876 A1* | 2/2009 | Zhang | H04L 41/12 709/223 |
| 2015/0295940 A1* | 10/2015 | Patel | H04L 67/34 726/29 |
| 2016/0128108 A1* | 5/2016 | Saija | H04W 4/50 370/254 |
| 2016/0345241 A1* | 11/2016 | Ji | H04W 8/02 |
| 2017/0359314 A1* | 12/2017 | Mathias | H04L 63/0428 |
| 2018/0063714 A1* | 3/2018 | Stephenson | H04W 12/35 |
| 2019/0089717 A1* | 3/2019 | Dolev | H04L 9/0866 |
| 2019/0306673 A1* | 10/2019 | Sharaga | H04M 15/00 |
| 2019/0386977 A1* | 12/2019 | Shah | H04W 12/30 |
| 2020/0059469 A1* | 2/2020 | Chellappa | H04L 9/085 |
| 2020/0127821 A1* | 4/2020 | Dolev | H04L 63/0823 |

* cited by examiner

AUTHORIZATION OF CLOUD-MANAGED NETWORK DEVICES

BACKGROUND

An organization may utilize cloud-based management of network devices to set up and manage networks and network devices of the organization with less cost and fewer information technology (IT) resources than via other network management techniques. Instead of on premise network management techniques that may require usage of specialized software and hardware at the organization's physical premises in order to manage the organization's network and network devices, an organization may instead use the cloud-based management system that is easily accessible over the Internet without needing to install additional specialized software and/or hardware.

The description provided in the background section should not be assumed to be prior art merely because it is mentioned in or associated with the background section. The background section may include information that describes one or more aspects of the subject technology.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1A:
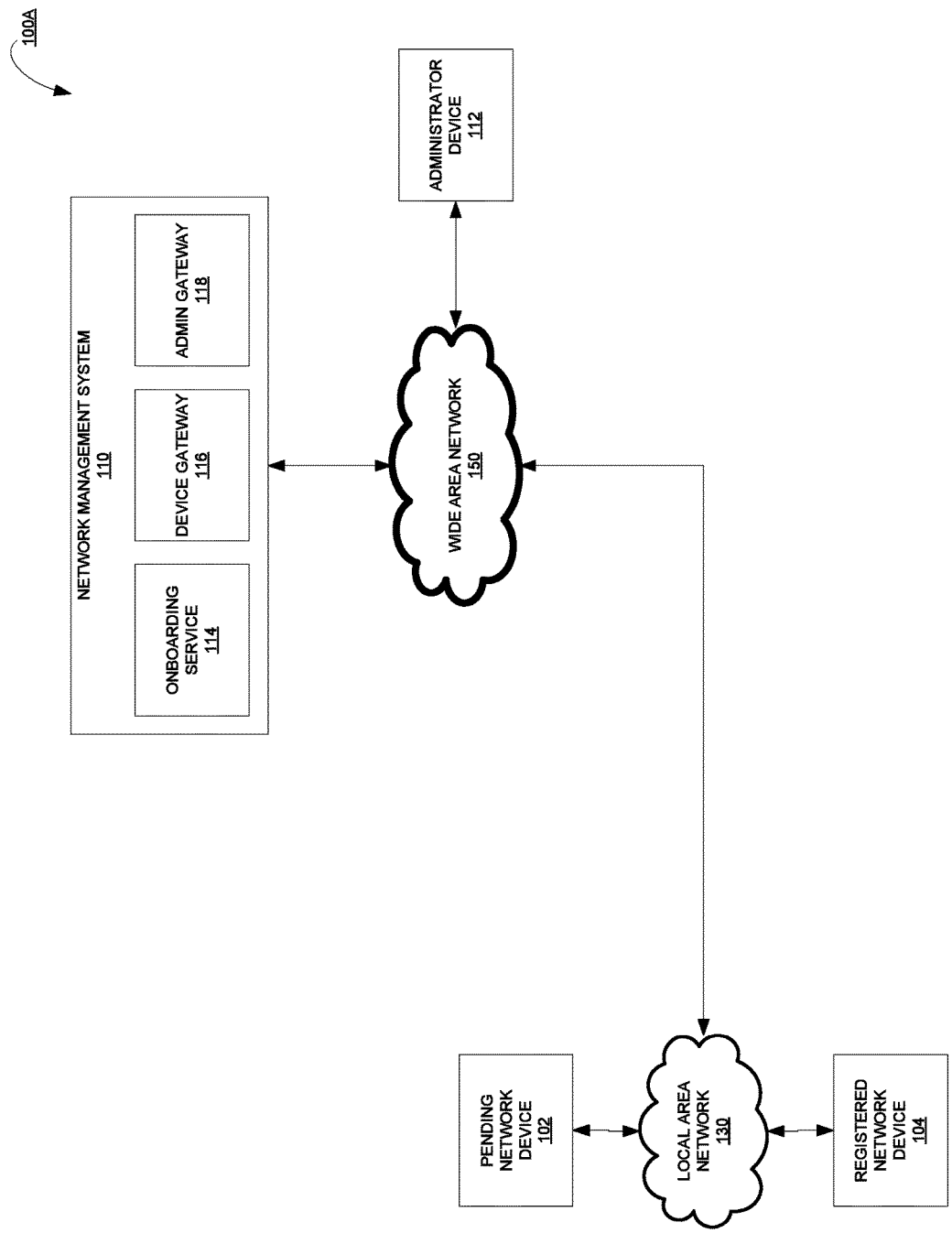
FIG. 1A illustrates an example architecture for registering a network device with an entity.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides for registering a newly deployed cloud-managed network device with an entity that utilizes cloud-based management of its networks and network devices. By registering the network device with an entity, the cloud-based network management system may be able to manage the network device according to the network management rules associated with the entity, and may enable the network device to access private network resources and private data that are associated with the entity. For example, network devices that are registered with an entity may access private networks associated with the entity, or may be able to freely send and receive data with each other.

To determine whether to register the newly deployed network device with an entity, the cloud-based network management system may determine whether the newly deployed network device is able to communicate, via a local area network (LAN) associated with the entity, with a network device that is already registered with the entity. Because an entity typically secures and limits physical access to the networking hardware (e.g., routers and network switches) making up its LAN, a network device that is able to be physically connected to the LAN associated with the entity, such as via wired networking, or a network device that is within a close enough physical range to connect to a wireless mesh network provided by a network device registered with the entity, is likely a network device that has been newly deployed by an administrator of the entity.

The disclosed system provides different techniques for registering a newly deployed cloud-managed network device with an entity based on whether the newly deployed network device is connected via wired networking to the entity's LAN, or if the newly deployed network device does not include wired networking capabilities. If the newly deployed network device is connected via wired networking (e.g., Ethernet) to the LAN, the network management system may send an onboarding token to the newly deployed network device. The newly deployed network device may receive the onboarding token and may send the onboarding token via the LAN to the network device that is already registered with the entity, and the network device may send the onboarding token it receives from the newly deployed network device to the network management system. The network management system may receive the onboarding token from the network device that is already registered with the entity and may compare it with the onboarding token that the network management system sent to the newly deployed network device. If the onboarding tokens match, the network management system may determine that the newly deployed network device is able to communicate via the LAN associated with the entity with the network device that is already registered with the entity, and may therefore register the newly deployed network device with the entity.

If the newly deployed network device does not include wired networking capabilities (e.g., does not include an Ethernet jack) and therefore only has wireless networking capabilities, the network management system may determine whether it can connect wirelessly to a wireless mesh network provided by a network device that is already associated with the entity. The network management system may instruct a network device that is already registered with the entity to create an open wireless mesh network or a network secured by a predefined pre-shared key (PSK) that is known to the network device. Because the newly deployed network device may be configured to scan for and join open wireless networks it encounters, the newly deployed network device may detect the open wireless mesh work and attempt to connect to the open wireless mesh network upon detecting the open wireless mesh network. If the newly deployed network device is able to connect to the open wireless mesh network, the network device may send, via the open wireless mesh network, an indication that it is connected to the open wireless mesh network to the network management system. Upon receiving the indication that the newly deployed network device is connected to the open wireless mesh network with the network management system, the network management system may send to the newly deployed network device authentication credentials for connecting to a secure wireless mesh network associated with the entity to complete registration of the newly deployed network device with the entity.

The disclosed system addresses a technical problem tied to computer technology and arising in the realm of computer networks, namely the technical problem of using a cloud-based network management system to register newly deployed network devices with an entity, in a secure manner that prevents malicious parties from registering malicious devices with the entity, as well as in a manner that limits the amount of intervention required by an administrator associated with the entity to register such newly deployed network devices with the entity.

According to certain aspects of the present disclosure, a computer-implemented method for registering a network device with an entity is provided. The method includes receiving, by a network management service (NMS) via a wide area network (WAN), a request to register a pending network device with an entity. The method further includes in response to receiving the request to register the pending network device with the entity, determining, by the NMS, whether the pending network device is able to communicate, via a local area network (LAN) associated with the entity, with a registered network device that is already registered with the entity. The method further includes in response to at least determining that the pending network device is able to communicate via the LAN with the registered network device, registering, by the NMS, the pending network device with the entity.

According to certain aspects of the present disclosure, a network management system for registering a network device with an entity is provided. The network management system includes memory comprising instructions. The network management system further includes a processor configured to execute the instructions which, when executed, cause the processor to: receive, via a wide area network (WAN), a request to register a pending network device with an entity; in response to receiving the request to register the pending network device with the entity, determine whether the pending network device is able to communicate, via a local area network (LAN) associated with the entity, with a registered network device that is already registered with the entity; and in response to at least determining that the pending network device is able to communicate via the LAN with the registered network device, register the pending network device with the entity.

According to certain aspects of the present disclosure, a non-transitory machine-readable storage medium comprising machine-readable instructions for causing a processor of a network management system to execute a method for registering a network device with an entity is provided. The method includes receiving, via a wide area network (WAN), a request to register a pending network device with an entity. The method further includes in response to receiving the request to register the pending network device with the entity, determining whether the pending network device is able to communicate, via a local area network (LAN) associated with the entity, with a registered network device that is already registered with the entity. The method further includes in response to at least determining that the pending network device is able to communicate via the LAN with the registered network device, registering the pending network device with the entity.

According to certain aspects, an apparatus for registering a network device with an entity is provided. The apparatus includes means for receiving, via a wide area network (WAN), a request to register a pending network device with an entity. The apparatus further includes means for in response to receiving the request to register the pending network device with the entity, determining whether the pending network device is able to communicate, via a local area network (LAN) associated with the entity, with a registered network device that is already registered with the entity. The apparatus further includes in response to at least determining that the pending network device is able to communicate via the LAN with the registered network device, registering the pending network device with the entity.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Example System Architectures

FIG. 1A illustrates an example architecture 100A for registering a network device with an entity. As shown in FIG. 1A, architecture 100A includes NMS 110, pending network device 102, registered network device 104, and administrator device 112. NMS 110 may be connected to administrator device 112 and local area network (LAN) 130 via wide area network (WAN) 150, and pending network device 102 and registered network device 104 may be connected to LAN 130. Registered network device 104 may be a network device that is registered with the entity while pending network device 102 may be a newly deployed network device that has yet to register with the entity.

Network management system (NMS) 110 may be any suitable system, such as a cloud-based system, comprising one or more computing devices that are configured to manage networks and network devices such as network switches routers, access points, gateways, and the like. NMS 110 may connect to such network devices via WAN 150 (e.g., the Internet) via wired or wireless means, such as Ethernet or wireless local area network (WLAN).

NMS 110 may be configured to manage a network of an entity, such as an organization, a business, a company, a department, and the like. Because the entity uses NMS 110 to manage its network, the entity is a customer of NMS 110 and may accordingly have a customer account at NMS 110 associated with the entity. An entity may register its network devices with NMS 110 so that NMS 110 can identify the entity to which a network device belongs. By identifying the entity to which a network device belongs, NMS 110 may be able to manage the network device according to any rules associated with the entity and can bill the customer account associated with the entity for managing the network device.

As NMS 110 manages network devices of an entity, the entity may deploy additional network devices that are also to be managed by NMS 110. The newly deployed network devices may request that the NMS 110 associate the network devices with an entity that utilizes NMS 110 to manage the entity's network devices. NMS 110 may receive such requests and may determine whether those newly deployed network devices were actually deployed by the entity and thus can properly be associated with the entity.

NMS 110 may include onboarding service 114, device gateway 116, and admin gateway 118. Onboarding service 114, device gateway 116, and admin gateway 118 may be implemented in any suitable fashion. For example, onboarding service 114, device gateway 116, and admin gateway 118 may each be a Hyper Text Transfer Protocol Secure (HTTPS) server. Onboarding service 114 may provide services for registering a network device with an entity managed by NMS 110. Prior to being registered with an entity managed by NMS 110, a networking device may only be able to access onboarding service 114. Thus, onboarding service 114 may provide basic device identification information and state information that may be used to register a network device with the entity. Device gateway 116 may be a connection point that provides services for network devices that are registered with an entity managed by NMS 110. For example, network devices may access device gateway 116 to access private network information associated with the entity, access information regarding the entity's network, and the like. Admin gateway 118 provides a connection point for an administrator to access NMS 110 to manage a network. For example, an administrator associated with an entity may access admin gateway 118 to administrate and manage the network associated with the entity.

As shown in FIG. 1A, LAN 130 may be a local area network associated with an entity managed by NMS 110. LAN 130 may include networking hardware such as routers, switches, access points, and the like that enable networking devices and computing devices connected to LAN 130 to access WAN 150. Pending network device 102 and registered network device 104 may be any suitable network devices, such as routers, switches, access points (e.g., WiFi access points), and the like. Registered network device 104 may be a network device that has already been registered with the entity by NMS 110 while pending network device 102 may be a newly deployed network device that is not yet registered with the entity.

Registered network device 104 may be connected to local area network (LAN) 130. Pending network device 102 may also be connected to LAN 130, but because pending network device 102 has not yet been registered with the entity associated with LAN 130, LAN 130 may limit the functionality of pending network device 102. For example, pending network device 102 may not be able to send and receive arbitrary data to arbitrary network devices, but may instead be limited to accessing certain services (e.g., onboarding service 114) of NMS 110 and to broadcasting data packets within LAN 130.

Administrator device 112 may be any suitable computing device that is used by an administrator of the entity to manage the entity's network. An administrator of the entity may communicate with admin gateway 118 of NMS 110 to authorize the registration of new network devices with the entity or to perform any other suitable administrative or managerial tasks for the network associated with the entity.

To determine whether a newly deployed network device can be properly associated with an entity, NMS 110 may determine whether the newly deployed network device is able to communicate, via a local area network (LAN) associated with the same entity, with a network device that is already registered with the same entity. If so, NMS 110 may determine that the newly deployed network device can be property associated with the entity, and may proceed with associating the network device with the entity.

In accordance with aspects of the present disclosure, NMS 110 may receive, via WAN 150, a request to register a pending network device 102 with an entity. In the example of FIG. 1A, pending network device 102 is connected via a wired connection to LAN 130 associated with the entity. For example, pending network device 102 may be connected via an Ethernet cable to a network switch in LAN 130. Because pending network device 102 is connected via a wired connection to LAN 130 associated with the entity, pending network device 102 may send the request through LAN 130 and one or more edge routers 132 to NMS 110 via WAN 150.

In response to receiving the request to register pending network device 102 with the entity, NMS 110 may determine whether pending network device 102 is able to communicate via a local area network (LAN) with a registered network device that is already registered with the entity. In the example of FIG. 1A, registered network device 104 may be a network device that is already registered with the entity. To determine whether pending network device 102 is able to communicate via LAN 130 with registered network device 104, NMS 110 may send an onboarding token to pending network device 102, and may determine whether NMS 110 receives an onboarding token from registered network device 104 that matches the onboarding token from pending network device. If NMS 110 determines that the onboarding token it received from registered network device 104 matches the onboarding token it sent to pending network device 102, NMS 110 may determine that pending network device 102 is able to communicate via LAN 130 with registered network device 104.

The onboarding token sent by NMS 110 to pending network device 102 may include a token identifier, such as "0xa14f2c", that uniquely identifies the onboarding token. The onboarding token may also include a retry instruction that instructs pending network device 102 to retry sending the request to register itself with the entity after a specified time period, such as ten seconds.

Pending network device 102 may receive the onboarding token from NMS 110 and, in response, may schedule a job to retry sending the request to register itself with the entity after the time specified by the onboarding token. Pending network device 102 may also, in response to receiving the onboarding token from NMS 110, periodically broadcast the onboarding token in LAN 130. For example, pending network device 102 may periodically send the onboarding token in User Datagram Protocol (UDP) broadcast packets that also includes an indication of pending network device 102's base media access control (MAC) address, an indication of pending network device 102's uptime, as well as other suitable details. An example contents of a UDP broadcast packet sent by pending network device 102 is illustrated below:

```
struct { 827482
    //Magic value to identify the packet. Must be
    0xf1839a44, in network order
    uint32 magic;
    //OCDP version. Must be set to 1, in network order
    uint16 version;
    //Device uptime in milliseconds, in network order
    uint64 uptime;
    //Device base MAC address
    uint8 base__mac__address[6];
    //Onboarding token received from the onboarding server
    //Up to 256 printable ASCII characters (decimal 32 to
    126), unused bytes set to 0
    uint8 onboarding__token[256];
}
```

Network devices in LAN 130 that are already registered with the entity (e.g., registered network device 104) may listen for such broadcasts from newly deployed network devices in LAN 130 that are not yet registered with the entity, such as pending network device 102, and may store the details for up to N (e.g., 64) network devices that are sending such broadcasts in LAN 130. If more than N network devices are sending such broadcasts in LAN 130, the network devices may apply a Least Recently Used rule to determine the details of a newly deployed network device that is to be replaced.

In the example of FIG. 1A, registered network device 104 may listen for broadcasts from newly deployed network devices in LAN 130 that are not yet registered with the entity, and may, in response, receive the onboarding token being broadcast by pending network device 102. The onboarding token that includes a token identifier, such as "0xa14f2c". In response to receiving the onboarding token from pending network device 102, registered network device 104 may send the onboarding token it received from pending network device 102 to NMS 110 via WAN 150.

NMS 110 may receive an onboarding token from a network device that is already registered with the entity and compare it with an onboarding token it had recently sent to a newly deployed network device that is not yet registered with the entity to determine whether the onboarding token it receives matches a recently sent onboarding token. For example, NMS 110 may track the M most recently sent onboarding tokens, where M is an integer such as 5 or 10, or may track the onboarding tokens sent in the previous L seconds, where L is an integer such as 30 or 60. To determine whether the onboarding token it receives matches a recently sent onboarding token, NMS 110 may determine whether the token identifier included in the received onboarding token is the same as the token identifier of one of the recently sent onboarding tokens. If so, NMS 110 may determine that the onboarding token it receives matches a recently sent onboarding token.

In the example of FIG. 1A, NMS 110 may receive the onboarding token from registered network device 104 and may determine whether the received onboarding token matches a recently sent onboarding token. Because NMS 110 has recently sent an onboarding token to pending network device 102, NMS 110 may determine whether the onboarding token received from registered network device 104 matches the onboarding token sent to pending network device 102 by determining whether the token identifier included in the onboarding token received from registered network device 104 is the same as the token identifier included in the onboarding token sent to pending network device 102. In response to determining that the onboarding token received from registered network device 104 matches the onboarding token sent to pending network device 102, NMS 110 may determine that pending network device 102 is able to communicate via LAN 130 with registered network device 104.

In response to at least determining that pending network device 102 is able to communicate via LAN 130 with registered network device 104, NMS 110 may register pending network device 102 with the entity. Associating a network device with the entity enables the network device to connect to the device gateway 116 of NMS 110 and to communicate with NMS 110 via device gateway 116.

To associate a network device with the entity, NMS 110 may mark the network device as being associated with the entity, so that the next time NMS 110 receives a request from the network device to associate the network device with the entity, NMS 110 may determine it has marked the network device as being associated with the entity, and may send credentials for connecting to device gateway 116 of NMS 110 to the network device.

In some examples, NMS 110 may also determine whether the uptime of pending network device 102 is within a valid range prior to registering pending network device 102 with the entity. Thus, registering pending network device 102 with the entity may be in response to at least determining that pending network device 102 is able to communicate via LAN 130 with registered network device 104 and determining that the uptime of pending network device 102 is within a valid range.

Determining whether the uptime of pending network device 102 is within a valid range prior to registering pending network device 102 with the entity provides another security measure to prevent malicious devices from being associated with the entity. As discussed above, when pending network device 102 sends broadcast packets in LAN 130, the broadcasts packets includes an indication of the uptime of pending network device 102. Thus, in addition to sending an onboarding token to NMS 110, registered network device 104 may also send an indication of the uptime of pending network device 102, as indicated in the broadcast packets sent by pending network device 102, to NMS 110.

NMS 110 may receive the indication of the uptime of pending network device 102 from registered network device 104 and may determine whether the uptime of pending network device 102 is within a valid range. Because each request sent by pending network device 102 includes an indication of the uptime of pending network device 102 at that time, NMS 110 may determine the valid range of the uptime of pending network device 102 by adding the uptime of pending network device 102 indicated in the most recent request sent by pending network device 102 to the elapsed time since NMS 110 received the most recent request sent by pending network device 102, and creating a range by adding a buffer (e.g., 10%) above and below the computed sum. Thus, given the sum of pending network device 102 indicated in the most recent request sent by pending network device 102 and the elapsed time since NMS 110 received the most recent request sent by pending network device 102 adding up to 1000 milliseconds, the valid range may be between 900-1100 milliseconds.

NMS 110 may therefore determine whether the uptime of pending network device 102 as indicated in the communications from registered network device 104 falls within the valid range. Thus, if NMS 110 determines that pending network device 102 is able to communicate via LAN 130 with registered network device 104 and if NMS 110 determines that the uptime of pending network device 102 is within the valid range, NMS 110 may register pending network device 102 with the entity.

In some examples, NMS 110 may also require an administrator associated with the entity to approve registering a pending network device with the entity prior to associating the pending network device with the entity. Thus, when NMS 110 determines that pending network device 102 is able to communicate via LAN 130 with registered network device 104, and that the uptime of pending network device 102 is within a valid range, NMS 110 may send information regarding pending network device 102 to administrator device 112. Such information regarding pending network device 102 may include the serial number of pending network device 102, the model of pending network device 102, and the like, that the administrator associated with the entity using administrator device 112 may use to decide whether to authorize registering pending network device 102 with the entity.

If the administrator associated with the entity authorizes pending network device 102 to be associated with the entity, administrator device 112 may send an authorization message to NMS 110. In response to receiving the authorization message from administrator device 112, NMS 110 may register pending network device 102 with the entity.

Figure 1B:
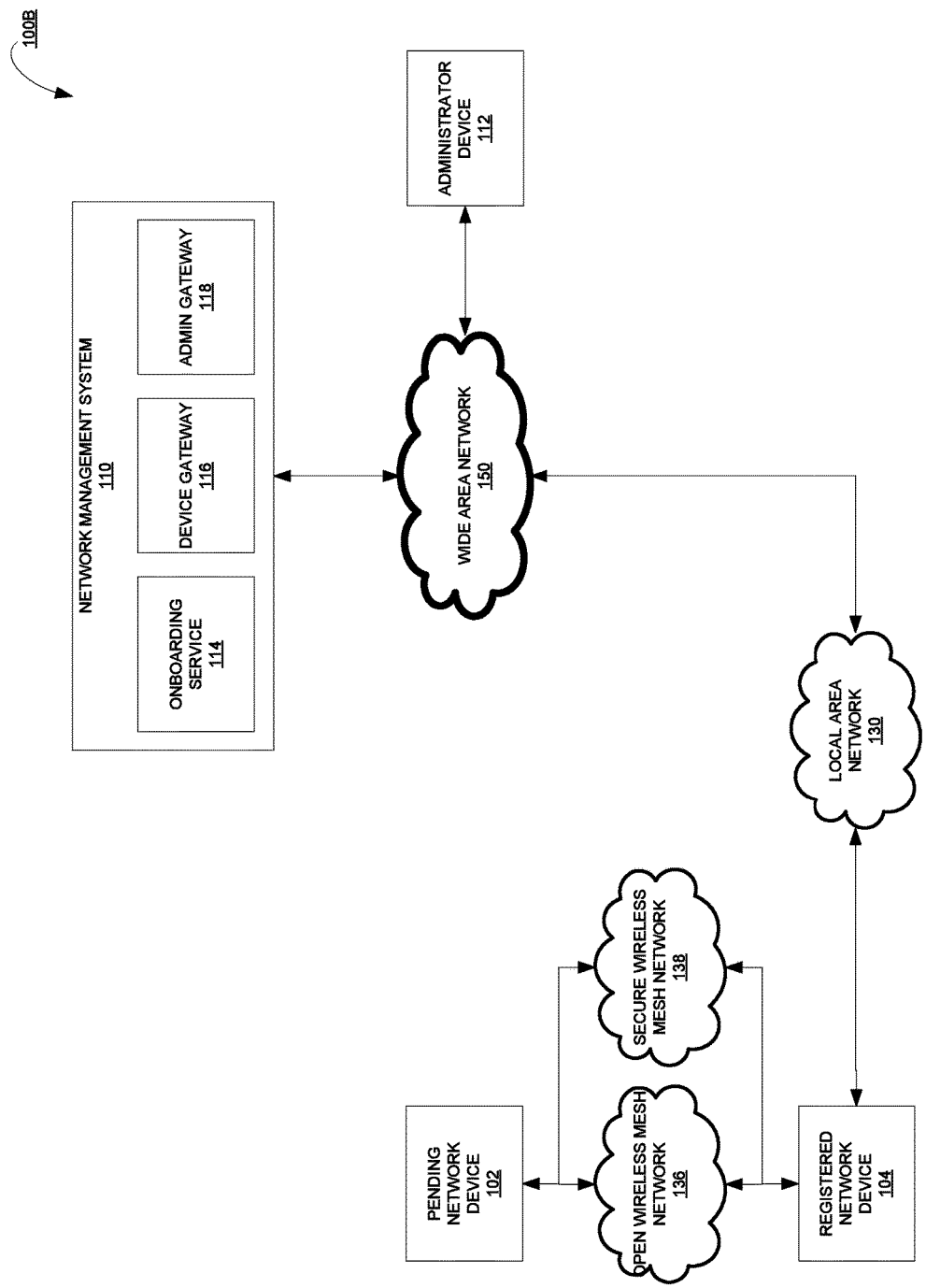
FIG. 1B illustrates an example architecture for registering a network device with an entity.

FIG. 1B illustrates an example architecture 100B for registering a network device with an entity. The architecture 100B includes NMS 110, pending network device 102, registered network device 104, and administrator device 112.

In the example of FIG. 1B, pending network device 102 may not include wired networking capabilities (e.g., an Ethernet jack) and therefore may not be able to connect via a wired connection (e.g., Ethernet) to a LAN associated with the entity. Instead, pending network device 102 may include wireless networking capabilities, such as a WiFi radio. Thus, pending network device 102 may not be able to connect to a wire-based LAN to which registered network device 104 is connected in order to communicate with registered network device 104.

Thus, in order to enable pending network device 102 to communicate with registered network device 104, registered network device 104 may create its own LAN in the form of open wireless mesh network 136. As discussed above, in some examples, registered network device 104 may create a wireless mesh network that is secured by a PSK that is known by registered device 104 and also newly deployed network devices such as pending network device 102, and the techniques described herein may be equally applicable to a system that utilizes a wireless mesh network that is secured by a PSK in place of open wireless mesh network 136. If NMS 110 determines that pending network device 102 is at least able to connect to open wireless mesh network 136 to communicate with registered network device 104, NMS 110 may register pending network device 102 with the entity.

In accordance with aspects of the present disclosure, NMS 110 may direct network devices that are registered with an entity to create open wireless mesh networks upon receiving authorization from an administrator associated with the entity to do so. Thus, NMS 110 may receive from administrator device 112 authorization to create open wireless mesh networks and may, in response, send instructions to registered network device 104 to create an open wireless mesh network.

Each wireless mesh network may be associated with a wireless mesh network identifier that identifies the associated wireless mesh network. For example, NMS 110 may associate a wireless mesh Basic Service Set Identifier (BSSID) with each of the wireless mesh networks, including a wireless mesh BSSID that is to be created by registered network device 104.

Registered network device 104 may receive the instructions from NMS 110 and may, in response, create open wireless mesh network 136. Open wireless mesh network 136 may be controlled by an access control list that restricts network traffic of open wireless mesh network 136 to onboarding service 114. In this way, network devices may not be able to connect to open wireless mesh network 136 to communicate with device gateway 116 via open wireless mesh network 136. In some examples, the access control list may also allow network traffic of open wireless mesh network 136 to a Dynamic Host Configuration Protocol (DHCP) server in WAN 150 or LAN 130 to enable pending network device 102 to receive an Internet Protocol (IP) address from the DHCP server.

Pending network device 102 may scan for open wireless mesh networks associated with the entity that are within range. The open wireless mesh networks associated with an entity may have specified patterns in its Service Set Identifier (SSID) or may have other attributes that identify the open wireless mesh networks as being associated with the entity. Pending network device 102 may detect that open wireless mesh network 136 is associated with the entity and may, in response, connect to open wireless mesh network 136. Pending network device 102 may also receive an IP address, either from a DHCP server in WAN 150 or LAN 130.

In accordance with aspects of the present disclosure, NMS 110 may receive, via WAN 150, a request to register pending network device 102 with an entity. In the example of FIG. 1B, pending network device 102, when connected to open wireless mesh network 136, may be able to send, via open wireless mesh network 136, LAN 130, and WAN 150, a request to register pending network device 102 with an entity, and NMS 110 may receive the request from pending network device 102. The request sent by pending network device 102 may include identifying information associated with pending network device 102, such as pending network device 102's serial number, pending network device 102's model, and the like. The request may also include a wireless mesh network identifier associated with open wireless mesh network 136, such as the wireless mesh BSSID associated with open wireless mesh network 136, that identifies the open wireless mesh network 136 created by registered network device 104 to which pending network device 102 is connected.

In response to receiving the request to register pending network device 102 with the entity, NMS 110 may determine whether pending network device 102 is able to communicate via a LAN with a registered network device that is already registered with the entity, such as registered network device 104. In particular, NMS 110 may determine whether the registration request was sent by pending network device 102 via one of the open wireless mesh networks created by network devices that are registered with the entity.

To determine whether the registration request was sent by pending network device 102 via one of the open wireless mesh networks created by network devices that are registered with the entity, NMS 110 may compare the wireless mesh BSSID sent by pending network device 102 with a record of wireless mesh BSSIDs associated with open wireless mesh networks that were created by network devices that are registered with the entity. If the wireless mesh BSSID sent by pending network device 102 matches one of the wireless mesh BSSIDs associated with open wireless mesh networks that were created by network devices that are registered with the entity, NMS 110 may determine that the pending network device 102 is able to communicate via a LAN with a registered network device that is already registered with the entity, the LAN being in this case an open wireless mesh network created by a registered network device that is already registered with the entity.

In the example of FIG. 1B, NMS 110 may compare the wireless mesh BSSID sent by pending network device 102 with its record of the wireless mesh BSSID of open wireless mesh network 136 created by registered network device 104 and may determine that the wireless mesh BSSID sent by pending network device 102 matches the wireless mesh BSSID of open wireless mesh network 136 created by registered network device 104. NMS 110 may therefore determine that pending network device 102 is able to communicate with registered network device 104 via the LAN that is open wireless mesh network 136 created by registered network device 104.

In response to at least determining that pending network device 102 is able to communicate via a LAN with registered network device 104, NMS 110 may register pending network device 102 with the entity. Registering pending network device 102 with the entity enables pending network device 102 to connect to the device gateway 116 of NMS 110 and to communicate with NMS 110 via device gateway 116.

One or more network devices that are associated with the entity may each provide a secure wireless mesh network that may enable devices connected to the secure wireless mesh network to send and receive data to and from device gateway 116. The secure wireless mesh networks may be secured by requiring authentication credentials (e.g., passwords) to join the secure wireless mesh networks Thus, in order to register pending network device 102 with the entity, pending network device 102 may connect to one of the secure wireless mesh networks provided by the one or more network devices that are associated with the entity in order to access device gateway 116.

To that end, NMS 110 may, in response to at least determining that pending network device 102 is able to communicate via a LAN with registered network device 104, NMS 110 may send to pending network device 102 information associated with a secure wireless mesh network created by a network device that is already registered with the entity. The information associated with the secure wireless mesh network may include the secure wireless mesh network's BSSID, authentication credentials for the secure wireless mesh network, and the like.

In the example of FIG. 1B, in response to determining that pending network device 102 is able to communicate with registered network device 104 via open wireless mesh network 136 created by registered network device 104, NMS 110 may send to pending network device 102 information associated with secure wireless mesh network 138 created by registered network device 104. The information associated with secure wireless mesh network 138 may include the secure wireless mesh network 138's BSSID, authentication credentials for secure wireless mesh network 138, and the like.

Pending network device 102 may receive the information associated with secure wireless mesh network 138 created by registered network device 104 and may use the received information to connect to secure wireless mesh network 138 created by registered network device 104 to access device gateway 116 via secure wireless mesh network 138, local area network 130, and WAN 150.

In some examples, NMS 110 may also require an administrator associated with the entity to approve registering a pending network device with the entity prior to associating the pending network device with the entity. Thus, when NMS 110 determines that pending network device 102 is able to communicate via open wireless mesh network 136 with registered network device 104, NMS 110 may send information regarding pending network device 102 to administrator device 112. Such information regarding pending network device 102 may include the serial number of pending network device 102, the model of pending network device 102, and the like, that the administrator associated with the entity using administrator device 112 may use to decide whether to authorize registering pending network device 102 with the entity.

If the administrator associated with the entity authorizes pending network device 102 to be associated with the entity, administrator device 112 may send an authorization message to NMS 110. In response to receiving the authorization message from administrator device 112, NMS 110 may proceed to register pending network device 102 with the entity, such as by sending to pending network device 102 information associated with secure wireless mesh network 138 created by registered network device 104.

Example Network Management Systems

Figure 2A:
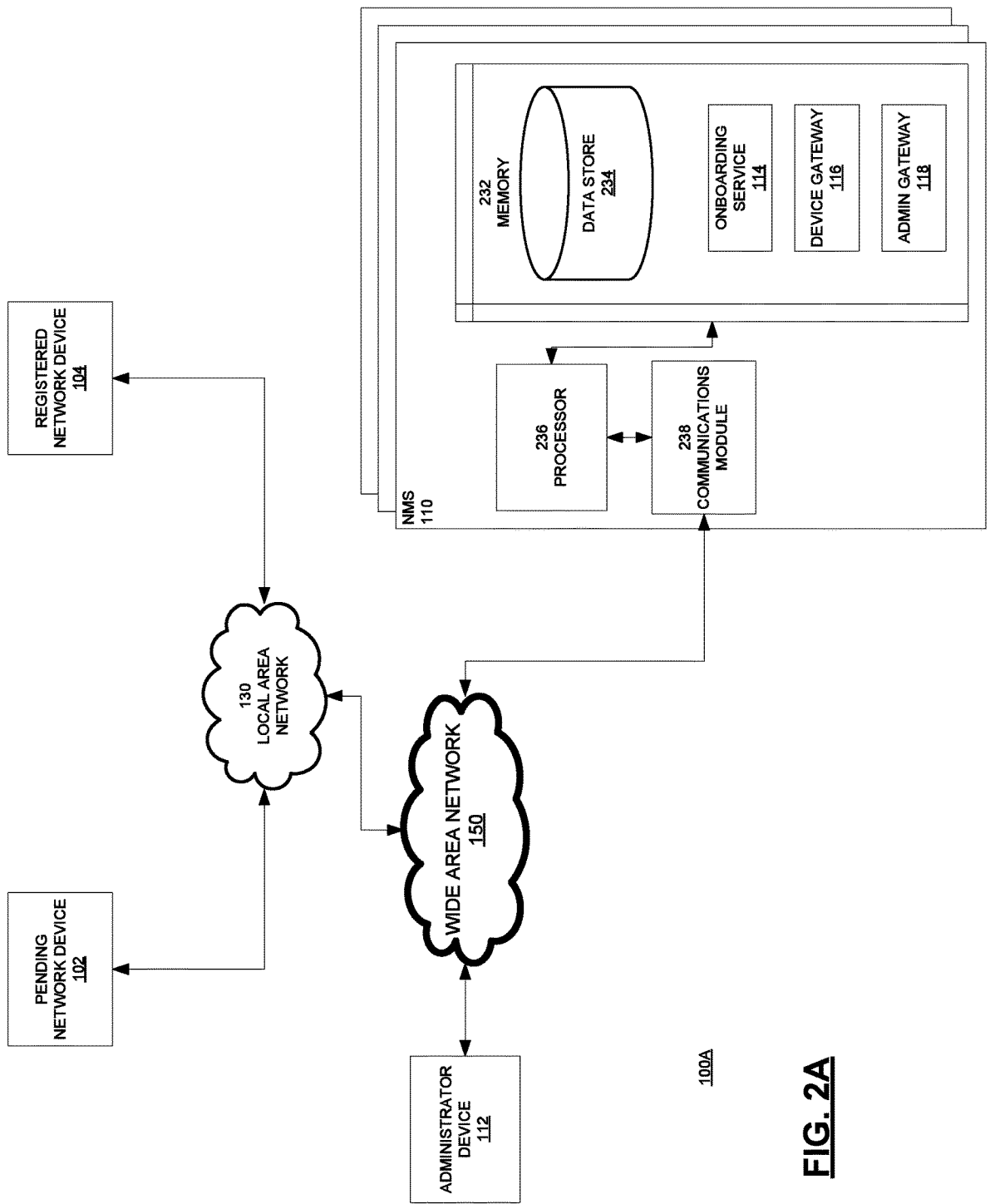
FIG. 2A is a block diagram illustrating an example network management system in the example architecture of FIG. 1A according to certain aspects of the disclosure.

FIG. 2A is a block diagram illustrating an example network management system 110 in the architecture 100A of FIG. 1A according to certain aspects of the disclosure. As shown in FIG. 2A, NMS 110 includes a processor 236, a communications module 238, and a memory 232 that includes onboarding service 114, device gateway 116, admin gateway 118, and data store 234. NMS 110 can be a set of one or more servers (e.g., a cloud-based system) that includes processors, communication devices, and memories distributed across the one or more servers that may perform all of the techniques described herein as being performed by NMS 110. As such, onboarding service 114, device gateway 116, admin gateway 118, and data store 234 may be distributed across multiple servers making up NMS 110.

NMS 110 connects to WAN 150 via communications module 238, and NMS 110 connects to administrator device 112 and LAN 130 via WAN 150. Further, NMS 110 connects to pending network device 102 and registered network device 104 via WAN 150 and LAN 130. Pending network device 102 and registered network device 104 may each be connected to LAN 130 via wired networking, such as Ethernet.

NMS 110 may be associated with an entity, which may be an organization, a business, an enterprise, and the like that uses NMS 110 to manage its network and its network devices. Onboarding service 114 of NMS 110 may execute to communicate with network devices that are attempting to register with the entity associated with NMS 110 and to register such network devices with the entity. Device gateway 116 may communicate only with network devices that are registered with the entity to provide features and services that are only available to network devices registered with the entity. Admin gateway 118 may communicate with devices that are used by administrators of the entity.

Processor 236 of NMS 110 is configured to execute instructions, such as instructions physically coded into processor 236, instructions received from software in memory 232, or a combination of both. For example, processor 236 of NMS 110 executes instructions to receive, via WAN 150, a request to register pending network device 102 with an entity. The request may be transmitted by pending network device 102 that is connected to LAN 130 via wired networking, such as via Ethernet, to onboarding service 114 of NMS 110. The request may include information associated with pending network device 102, such as the base media access control (MAC) address of pending network device 102, the serial number of pending network device 102, the model of pending network device 102, the version of pending network device 102, and the uptime of pending network device 102.

Processor 236 of NMS 110 may execute instructions to determine, based on the request received from pending network device 102, whether pending network device 102 is already registered with the entity. For example, data store 234 may store indications of network devices that are already registered with the entity, such as the based MAC address of each of the network devices that are already registered with the entity. Processor 236 of NMS 110 may execute instructions to compare the base MAC address of pending network device 102 with the base MAC addresses stored in data store 234 to determine whether pending network device 102 is already registered with the entity. If NMS 110 determines that pending network device 102 is already registered with the entity, processor 236 of NMS 110 may transmit to pending network device 102 instructions for connecting to device gateway 116. Once pending network device 102 is connected to device gateway 116, pending network device 102 may be able to access data and functionality reserved only for network devices registered with the entity.

If NMS 110 determines that pending network device 102 is not already registered with the entity, processor 236 of NMS 110 may execute instructions to, in response to receiving the request to register pending network device 102 with the entity, determine whether pending network device 102 is able to communicate, via LAN 130 associated with the entity, with registered network device 104 that is already registered with the entity. To make such a determination, processor 236 of NMS 110 may execute instructions to transmit an onboarding token to pending network device 102. The onboarding token that is transmitted to pending network device 102 includes a token identifier that may be unique to the onboarding token. For example, the token identifier may be a string of characters, such as "0xa14f2c". The onboarding token may also include a retry time, which is a specific later time for pending network device 102 to send another request to register with the entity. For example, the retry time may be 1000 milliseconds, which may indicate to pending network device 102 to send another request in 1000 milliseconds.

Processor 236 may execute instructions to store in data store 234 an association of token identifiers and pending network devices to which it has transmitted onboarding tokens that includes the token identifiers. For example, processor 236 may for each pending network device from which it has received a request to register with the entity, the information associated with the pending network device, such as the base MAC address, the serial number, the model, the version, and the uptime of the pending network device, as well as the token identifier included in the onboarding token sent to the pending network device. Thus, for pending network device 102, processor 236 may execute instructions to store in data store 234 the base MAC address of pending network device 102, the serial number of pending network device 102, the model of pending network device 102, the version of pending network device 102, the uptime of pending network device 102, and the token identifier of the onboarding token transmitted to pending network device 102.

Processor 236 may execute instructions to receive an onboarding token from registered network device 104. Because registered network device 104 is already registered with the entity, registered network device 104 may communicate with device gateway 116 to transmit the onboarding token to device gateway 116 of NMS 110. In response to receiving the onboarding token from registered network device 104, processor 236 may execute instructions to determine whether the onboarding token received from registered network device 104 matches the onboarding token transmitted to pending network device 102.

Determining whether the onboarding token received from registered network device 104 matches the onboarding token transmitted to pending network device 102 may include determining whether the token identifier included in the onboarding token received from registered network device 104 matches the token identifier included in the onboarding token transmitted to pending network device 102. In particular, processor 236 may execute instructions to determine whether the token identifier included in the onboarding token received from registered networking device 104 matches one of the token identifiers stored in data store 234, and more specifically processor 236 may execute instructions to determine whether the token identifier included in the onboarding token received from registered networking device 104 matches the token identifier included in the onboarding token transmitted to pending network device 102.

Processor 236 may execute instructions to, in response to at least determining that pending network device 102 is able to communicate via LAN 130 with registered network device 104, register pending network device 102 with the entity. In the example of FIG. 2A, processor 236 may execute instructions to, in response to at least determining that the onboarding token received from registered network device 104 matches the onboarding token transmitted to pending network device 102, register pending network device 102 with the entity.

Registering pending network device 102 with the entity includes storing an indication of pending network device 102, such as the base MAC address of pending network device 102, in data store 234. By being registered with the entity, pending network device 102 is linked to the entity's customer account in NMS 110. Pending network device 102 may be able to access networks and data that is only available to network devices registered with the entity, and may be managed by administrators of the entity.

After pending network device 102 is registered with the entity, processor 236 may execute instructions to receive a subsequent request to register pending network device 102 with the entity. As discussed above, the onboarding token that was transmitted to pending network device 102 may include a retry time, so that processor 236 may, upon reaching the retry time, transmit the subsequent request to register pending network device 102. Because pending network device 102 is now registered with the entity when NMS 110 receives the subsequent request from pending network device 102, processor 236 may execute to, in response to receiving the subsequent request to register pending network device 102 with the entity, transmit to pending network device 102 instructions for accessing device gateway 116. For example, the instructions may include the IP address of device gateway 116, authentication credentials for accessing device gateway 116, and the like. By accessing device gateway 116, processor 236 may access data, networks, functionalities, and the like that are only available to networking devices that are registered with the entity.

In some examples, NMS 110 may also determine whether the uptime of pending network device 102 is within a valid range prior to registering pending network device 102 with the entity. Thus, processor 236 may register pending network device 102 with the entity in response to determining that pending network device 102 is able to communicate via LAN 130 with registered network device 104 and further in response to determining that the uptime of the pending network device is within the valid range.

Determining whether the uptime of pending network device 102 is within a valid range provides another security measure to prevent malicious networking devices from being registered with the entity. In addition to transmitting an onboarding token to NMS 110, registered network device 104 may also transmit an indication of the uptime of pending network device 102.

Processor 236 may execute instructions to receive the indication of the uptime of pending network device 102 from registered network device 104 and may determine whether the uptime of pending network device 102 is within a valid range. Because each request received from pending network device 102 includes an indication of the uptime of pending network device 102 at the time the request was transmitted from pending network device 102, and because processor 236 executes instructions to store the uptime of the pending network device in data store 234 upon receiving the request from pending network device 102, processor 236 may execute instructions to determine a valid range of the uptime of pending network device 102 by adding the uptime of pending network device 102 stored in data store 234 to the elapsed time since NMS 110 received the most recent request sent by pending network device 102, and to create a valid uptime range by adding a buffer (e.g., 10%) above and below the computed sum. For example, if the sum of the uptime of pending network device 102 stored in data store 234 and the elapsed time since NMS 110 received the most recent request sent by pending network device 102 adding up to 1000 milliseconds, the valid uptime range may be between 900-1100 milliseconds.

In some examples, NMS 110 may require approval from an administrator of the entity in order to associate the pending network device with the entity. Thus, processor 236 may execute instructions to register pending network device 102 with the entity in response to determining that pending network device 102 is able to communicate via LAN 130 with registered network device 104, in response to determining that the uptime of the pending network device is within the valid range, and further in response to receiving approval from an administrator of the entity to register pending network device 102 with the entity.

Processor 236 may execute instructions to, in response to determining that pending network device 102 is able to communicate via LAN 130 with registered network device 104 and further in response to determining that the uptime of the pending network device is within the valid range, transmit, via admin gateway 118, an authorization request to administrator device 112 that is used by an administrator of the entity. The authorization request may include information associated with pending network device 102, such as its serial number, model, version, base MAC address, and the like. In response, the administrator of the entity may use administrator device 112 to transmit an authorization message to NMS 110 that authorizes the registration of pending network device 102 with the entity. Processor 236 may execute instructions to receive, via admin gateway 118, the authorization message from administrator device 112 and may, in response, register pending networking device 102 with the entity.

Figure 2B:
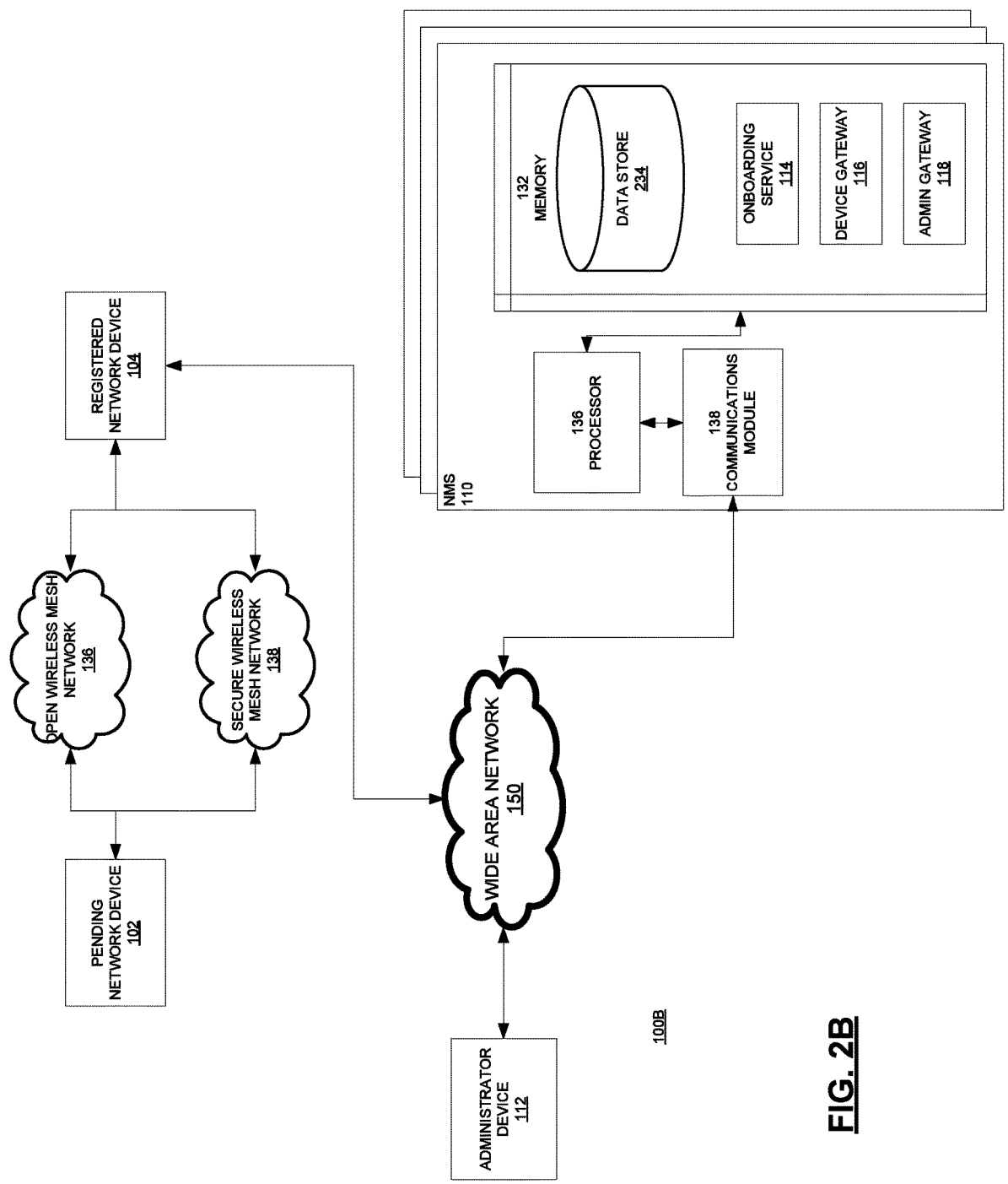
FIG. 2B is a block diagram illustrating an example network management system in the example architecture of FIG. 1B according to certain aspects of the disclosure.

FIG. 2B is a block diagram illustrating an example network management system 110 in the architecture 100B of FIG. 1B according to certain aspects of the disclosure. As shown in FIG. 2B, NMS 110 includes a processor 236, a communications module 238, and a memory 232 that includes onboarding service 114, device gateway 116, admin gateway 118, and data store 234. NMS 110 can be a set of one or more servers (e.g., a cloud-based system) that includes processors, communication devices, and memories distributed across the one or more servers that may perform all of the techniques described herein as being performed by NMS 110. Onboarding service 114, device gateway 116, admin gateway 118, and data store 234 may be distributed amongst the multiple servers making up NMS 110.

NMS 110 connects to WAN 150 via communications module 238, and NMS 110 connects to administrator device 112 and LAN 130 via WAN 150. Further, NMS 110 connects to registered network device 104 via WAN 150 and LAN 130. Pending network device 102 may not include wired network functionality, such as Ethernet, and therefore may connect to registered network device 104 via open wireless mesh network 136 and/or secure wireless mesh network 138.

NMS 110 may be associated with an entity, which may be an organization, a business, an enterprise, and the like that uses NMS 110 to manage its network and its network devices. Onboarding service 114 of NMS 110 may execute to communicate with network devices that are attempting to register with the entity associated with NMS 110 and to register such network devices with the entity. Device gateway 116 may communicate only with network devices that are registered with the entity to provide features and services that are only available to network devices registered with the entity. Admin gateway 118 may communicate with devices that are used by administrators of the entity.

Processor 236 of NMS 110 is configured to execute instructions, such as instructions physically coded into processor 236, instructions received from software in memory 232, or a combination of both. For example, processor 236 of NMS 110 executes instructions to receive, from an administrator of the entity, an authorization message to authorize registration of network devices with the entity via wireless mesh networking.

The administrator of the entity may have deployed network devices, such as pending network device 102, which do not include wired networking functionality. As such, the administrator may not be able to plug the newly deployed network devices via Ethernet into LAN 130. As such, NMS 110 may not be able to perform the techniques described herein with respect to FIGS. 1A and 2A to register these network devices with the entity. Instead, the administrator may utilize wireless mesh networking to register these deployed network devices with the entity.

As such, the administrator may use administrator device 112 to transmit an authorization message to authorize registration of network devices with the entity via wireless mesh networking to NMS 110, and processor 236 may execute instructions to receive the authorization message via admin gateway 118 from administrator device 112. Processor 236 may execute instructions to, in response to receiving the authorization message from administrator device 112, transmit instructions to network devices that are already registered with the entity, including registered network device 104, to create an open wireless mesh network. An open wireless mesh network may be a wireless mesh network that does not require authentication in order to be accessed, and may be protected, such as by an Access Control List, so that network devices that connect to the open wireless mesh network can only send and receive traffic to and from onboarding service 114.

Each open wireless mesh network may be associated with a unique wireless mesh network identifier, and processor 236 may execute instructions to store the wireless mesh network identifiers of the open wireless mesh networks created by the registered network devices in data store 234. In some examples, a wireless mesh network identifier may be referred to as a wireless mesh Basic Service Set Identifier (BSSID).

Registered network device 104 may receive the instructions to create an open wireless mesh network and may, in response, create open wireless mesh network 136. Pending network device 102 may be a newly deployed network device for the entity that is within the wireless range of open wireless mesh network 136. Pending network device 102 may scan for open wireless mesh networks within its wireless network range and may find open wireless mesh network 136. Pending network device 102 may connect to open wireless mesh network 136 and may transmit to onboarding service 114 of NMS 110 a request to register itself with the entity.

Registered network device 104 may receive, via onboarding service 114, the request to register pending network device 102 with the entity. The request may include information associated with pending network device 102, such as the serial number of pending network device 102, the model of pending network device 102, the version of pending network device 102, the uptime of pending network device 102, and the like. The request may also include the wireless mesh network identifier of open wireless mesh network 136 to which it is connected.

Processor 236 of NMS 110 may execute instructions to determine, based on the request received from pending network device 102, whether pending network device 102 is able to communicate via a LAN with registered network device 104. In particular, processor 236 may execute instructions to determine, based on the request received from pending network device 102, whether pending network device 102 is connected to an open wireless mesh network created by a network device that is already registered with the entity.

In particular, processor 236 may execute instructions to determine whether the wireless mesh network identifier included in the request to register pending network device 102 matches any one of the wireless mesh network identifiers stored in data store 234 associated with open wireless mesh networks created by a network device that is already registered with the entity. Processor 236 may execute instructions to determine that the wireless mesh network identifier included in the request to register pending network device 102 matches the wireless mesh network identifier associated with open wireless mesh network 136 created by registered network device 104, and may thereby determine that pending network device 102 is able to communicate via a LAN (e.g., open wireless mesh network 136) with registered network device 104.

Processor 236 may execute instructions to, in response to at least determining that pending network device 102 is able to communicate via a LAN with registered network device 104, register pending network device 102 with the entity. In the example of FIG. 2B, processor 236 may execute instructions to, in response to at least determining that the pending network device 102 is able to wirelessly connect to open wireless mesh network 136 created by registered network device 104, register pending network device 102 with the entity.

Registering pending network device 102 with the entity includes storing an indication of pending network device 102 in data store 234. By being registered with the entity, pending network device 102 is linked to the entity's customer account in NMS 110. Pending network device 102 may be able to access networks and data that is only available to network devices registered with the entity, and may be managed by administrators of the entity.

In response to pending network device 102 being registered with the entity, processor 236 may execute instructions to transmit to pending network device 102 information for connecting to a secure wireless mesh network created by a network device that is already registered to the entity. The secure wireless mesh network may enable network devices that are connected to it to access device gateway 116. For example, the information for connecting to a secure wireless mesh network may include the wireless mesh network identifier for the secure wireless mesh network, authentication credentials for authenticating pending network device 102 with the secure wireless mesh network such as a password or a pre-shared key, and information for accessing device gateway 116 such as its IP address and its authentication credentials.

In the example of FIG. 2B, processor 236 may execute instructions to transmit to pending network device 102 information for connecting to secure wireless mesh network 138 created by registered network device 104. Pending network device 102 may receive the information for connecting to secure wireless mesh network 138 and may connect to secure wireless mesh network 138 to access device gateway 116. By accessing device gateway 116, processor 236 may access data, networks, functionalities, and the like that are only available to networking devices that are registered with the entity.

In some examples, NMS 110 may require approval from an administrator of the entity in order to associate the pending network device with the entity. Thus, processor 236 may execute instructions to register pending network device 102 with the entity in response to determining that pending network device 102 is able to communicate via a LAN with registered network device 104 and further in response to receiving approval from an administrator of the entity to register pending network device 102 with the entity.

Processor 236 may execute instructions to, in response to determining that pending network device 102 is able to communicate via open wireless mesh network 136 with registered network device 104, transmit, via admin gateway 118, an authorization request to administrator device 112 that is used by an administrator of the entity. The authorization request may include information associated with pending network device 102, such as its serial number, model, version, wireless mesh network identifier, and the like. In response, the administrator of the entity may use administrator device 112 to transmit an authorization message to NMS 110 that authorizes the registration of pending network device 102 with the entity. Processor 236 may execute instructions to receive, via admin gateway 118, the authorization message from administrator device 112 and may, in response, register pending networking device 102 with the entity.

In some examples, NMS 110 may instruct network devices registered with the entity to stop providing open wireless mesh networks after it has registered pending network device 102 with the entity. Processor 236 may execute instructions to, in response to at least registering pending network device 102 with the entity, transmit to network devices registered with the entity, such as registered network device 104, instructions to stop providing the open wireless mesh network.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3A:
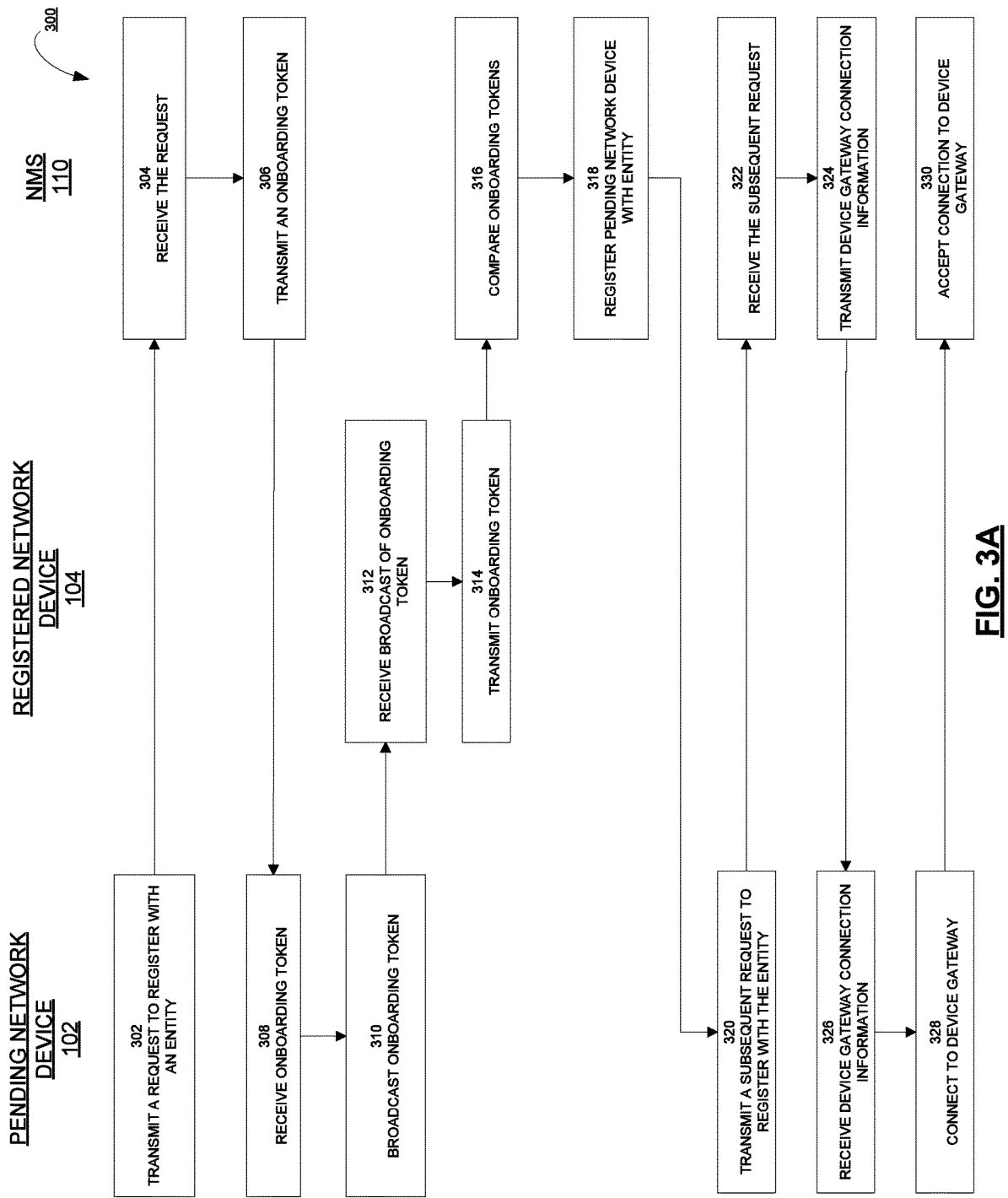
FIG. 3A illustrates an example process for registering a network device with an entity using the example pending network device, registered network device, and NMS of FIGS. 1A and 2A.

FIG. 3A illustrates an example process 300 for registering a network device with an entity using the example pending network device 102, registered network device 104, and NMS 110 of FIGS. 1A and 2A. While FIG. 3A is described with reference to FIGS. 1A and 2A, it should be noted that the process steps of FIG. 3A may be performed by other systems.

The process 300 begins by proceeding to step 302 where pending network device 102 may transmit to onboarding service 114 of NMS 110 a request to register itself with an entity. At step 304, onboarding service 114 of NMS 110 may receive the request from pending network device 102 and at step 306 onboarding service 114 of NMS 110 may transmit an onboarding token to pending network device 102. At step 308, pending network device 102 may receive the onboarding token from onboarding service 114 of NMS 110 and may, at step 310, broadcast the onboarding token and its uptime in LAN 130 to which pending network device 102 is connected via wired networking. At step 312, registered network device 104 may receive the onboarding token and the uptime broadcasted by pending network device 102. At step 314, registered network device 104 may transmit the onboarding token and the uptime to device gateway 116 of NMS 110.

At step 316, device gateway 116 of NMS 110 may receive the onboarding token and the uptime of pending network device 102 from registered network device 104 and may compare the onboarding token received from registered network device 104 with the onboarding token transmitted by onboarding service 114 to pending network device 102 and determine if the uptime is within a valid range. If NMS 110 determines that the onboarding token received from registered network device 104 matches the onboarding token transmitted by onboarding service 114 to pending network device 102, and if NMS 110 determines that the uptime of pending network device 102 is within the valid range, at step 318 onboarding service 114 may register pending network device 102 with the entity. Subsequent to onboarding service 114 registering pending network device 102 with the entity, pending network device 102 may, at step 320, transmit a subsequent request to onboarding service 114 of NMS 110 to register pending network device 102 with the entity. At step 322, onboarding service 114 of NMS 110 may receive the subsequent request from pending network device 102.

Onboarding service 114 of NMS 110 may determine that pending network device 102 is registered with the entity and may, at step 324, transmit to pending network device 102 information for connecting to device gateway 116 of NMS 110. At step 326, pending network device 102 may receive the information for connecting to device gateway 116 of NMS 110. At step 328, pending network device 102 may connect to device gateway 116 of NMS 110 using the information received from NMS 110. At step 330, device gateway 116 of NMS 110 may accept the connection from pending network device 102 because pending network device 102 is registered with the entity. In this way, NMS 110 may register a pending network device 102 that is connected via a wired networking connection to LAN 130 associated with the entity.

Figure 3B:
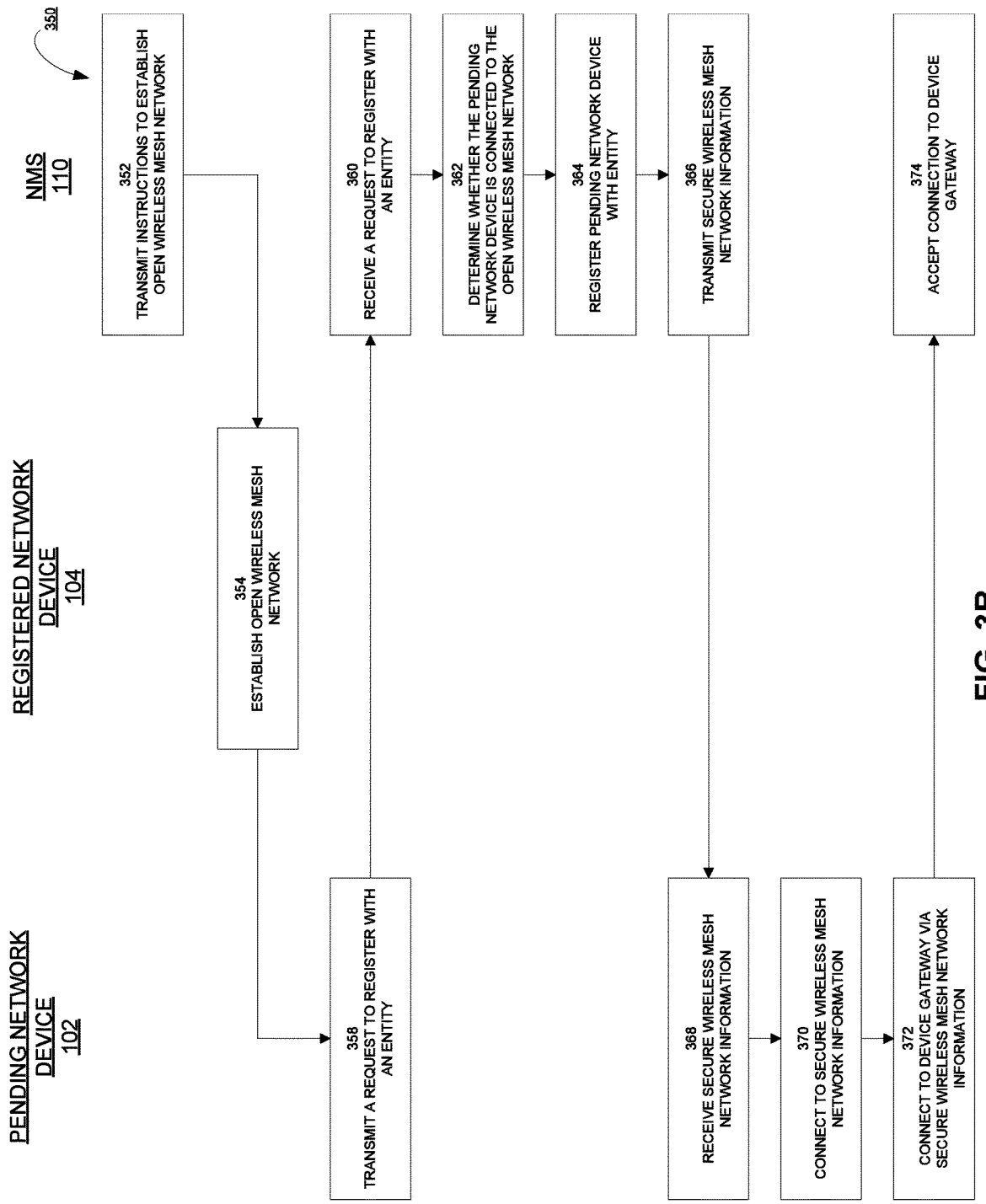
FIG. 3B illustrates an example process for registering a network device with an entity using the example pending network device, registered network device, and NMS of FIGS. 1B and 2B.

FIG. 3B illustrates an example process 350 for registering a network device with an entity using the example pending network device 102, registered network device 104, and NMS 110 of FIGS. 1B and 2B. While FIG. 3B is described with reference to FIGS. 1B and 2B, it should be noted that the process steps of FIG. 3B may be performed by other systems.

The process 350 begins by proceeding to step 352 where device gateway 116 of NMS 110 may transmit, to network devices registered with the entity, instructions to establish an open wireless mesh network. At step 354, registered network device 104 may receive the instructions and may, in response, establish open wireless mesh network 136. At step 358, pending network device 102 may connect to open wireless mesh network 136 and may transmit, via open wireless mesh network 136 to onboarding service 114 of NMS 110, a request to register itself with the entity. At step 360, onboarding service 114 of NMS 110 may receive the request from pending network device 102 and may, at step 362, determine whether pending network device 102 is connected to an open wireless mesh network created by a network device registered with the entity.

Onboarding service 114 of NMS 110 may determine whether pending network device 102 is connected to an open wireless mesh network created by a network device registered with the entity by comparing the wireless mesh network identifier included in the request with the wireless mesh network identifiers of open wireless mesh network identifiers created by network devices registered with the entity. At step 364, onboarding service 114 of NMS 110 may determine that the wireless mesh network identifier included in the request with the wireless mesh network identifiers matches the wireless mesh network identifier of open wireless mesh network 136 created by registered network device 104, and may register pending network device 102 with the entity.

At step 366, in response to registering pending network device 102 with the entity, onboarding service 114 of NMS 110 may transmit to pending network device 102 information regarding secure wireless mesh network 138 created by registered network device 104 as well as information for connecting to device gateway 116. At step 368, pending network device 102 may receive the information regarding secure wireless mesh network 138 created by registered network device 104 and at step 370 may connect to the secure wireless mesh network 138 created by registered network device 104. At step 372, pending network device 102 may connect to device gateway 116 via secure wireless mesh network 138 using the information received from NMS 110. At step 374, device gateway 116 may accept the connection from pending network device 102 because pending network device 102 is registered with the entity. In this way, NMS 110 may register a pending network device 102 that is connected via a wireless mesh network.

Figure 4:
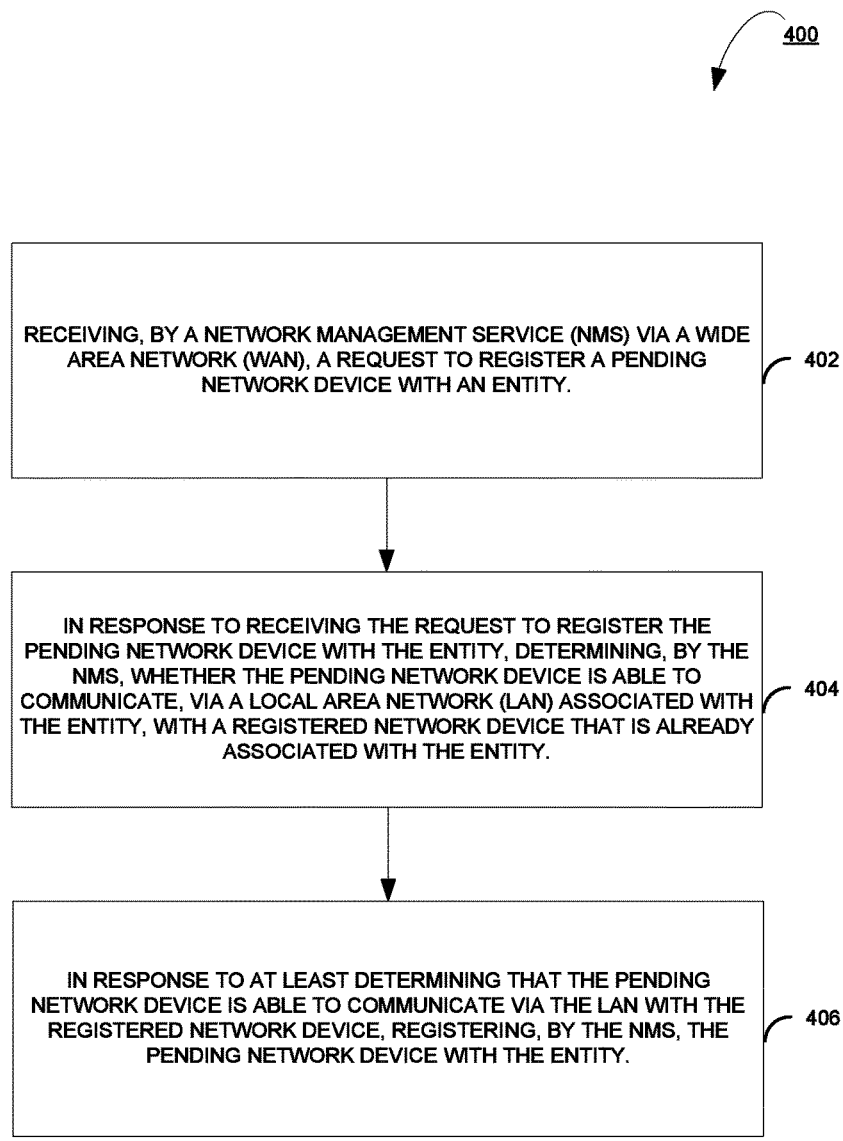
FIG. 4 illustrates an example process for registering a network device with an entity using the example pending network device, registered network device, and NMS of FIGS. 1A, 1B, 2A and 2B.

FIG. 4 illustrates an example process 400 for registering a network device with an entity using the example pending network device 102, registered network device 104, and NMS 110 of FIGS. 1A, 1B, 2A and 2B. While FIG. 4 is described with reference to FIGS. 1A, 1B, 2A and 2B, it should be noted that the process steps of FIG. 4 may be performed by other systems.

The process 400 begins by proceeding to step 402, where NMS 110 may receive via WAN 150 a request to register pending network device 102 with an entity. The process proceeds to step 404, where NMS 110 may, in response to receiving the request to register pending network device 102 with the entity, determine whether pending network device 102 is able to communicate, via a local area network (LAN) associated with the entity, with registered network device 104 that is already registered with the entity. The process proceeds to step 406, where NMS 110 may, in response to at least determining that pending network device 102 is able to communicate via the LAN with registered network device 104, register pending network device 102 with the entity.

In some examples, pending network device 102 and registered network device 104 are connected to LAN 130 via wired networking. In some examples, determining whether pending network device 102 device is able to communicate via the LAN with registered network device 104 further includes NMS 110 transmitting a first onboarding token to pending network device 102, NMS 110 receiving a second onboarding token from registered network device 104, and NMS 110 determining whether the second onboarding token matches the first onboarding token. In some examples, NMS 110, in response to at least determining that pending network device 102 is able to communicate via the LAN with registered network device 104, registering pending network device 102 with the entity further includes NMS 110, in response to at least determining that the second onboarding token matches the first onboarding token, registering pending network device 102 with the entity.

In some examples, NMS 110 may receive, via WAN 150, a second request to register pending network device 102 with the entity, where the request to register pending network device 102 with the entity is a first request to register pending network device 102 with the entity. In some examples, NMS 110 may, in response to associating pending network device 102 with the entity and in response to receiving the second request to register pending network device 102 with the entity, send to pending network device 102, instructions for accessing device gateway 116 of NMS 110 that is associated with the entity.

In some examples, NMS 110 registering pending network device 102 with the entity is further in response to NMS 110 receiving approval from an administrator of the entity to associate pending network device 102 with the entity.

In some examples, NMS 110 may further receive, from registered network device 104, an indication of an uptime of pending network device 102. NMS 110 may further determine whether the uptime of pending network device 102 is within a valid range, where NMS 110 registering pending network device 102 with the entity is further in response to determining that the uptime of pending network device 102 is within the valid range.

In some examples, NMS 110 may further transmit instructions to registered networking device 104 to create open wireless mesh network 136. In some examples, NMS 110 determining whether pending network device 102 is able to communicate via the LAN with registered network device 104 further includes NMS 110 determining whether pending network device 102 is able to wirelessly connect to open wireless mesh network 136 created by registered network device 104. In some examples, NMS 110, in response to determining at least that pending network device 102 is able to communicate via the LAN with registered network device 104, registering pending network device 102 with the entity may further, in response to determining at least that pending network device 102 is able to wirelessly connect to open wireless mesh network 136 created by registered network device 104, register pending network device 102 with the entity.

In some examples, the request to register pending network device 102 with the entity may include a wireless mesh network identifier. In some examples, NMS 110 determining whether pending network device 102 is able to wirelessly connect to open wireless mesh network 136 created by registered network device 104 further includes NMS 110 determining whether the wireless mesh network identifier included in the request to register pending network device 102 matches a wireless mesh network identifier associated with open wireless mesh network 136 created by registered network device 104. In some examples, NMS 110 may, in response to determining that the wireless mesh network identifier included in the request to register pending network device 102 matches the wireless mesh network identifier associated with open wireless mesh network 136 created by registered network device 104, determine that pending network device 102 is able to wirelessly connect to open wireless mesh network 136 created by registered network device 104.

In some examples, NMS 110 registering pending network device 102 with the entity may further include NMS 110 transmitting, to pending network device 102, information for connecting to secure wireless mesh network 138 created by registered network device 104, where pending network device 102 is able to connect to device gateway 116 of NMS 110 via secure wireless mesh network 138, and where the information for connecting to secure wireless mesh network 138 created by registered network device 104 includes authentication credentials for authenticating pending network device 102 with secure wireless mesh network 138.

In some examples, NMS 110 may transmit the instructions to registered network device 104 to create open wireless mesh network 136 in response to receiving, from an administrator of the entity, an authorization message to authorize registration of network devices with the entity via wireless mesh networking.

In some examples, NMS 110 may further, in response to at least registering pending network device 102 with the entity, transmit, to registered network device 104, instructions to stop providing open wireless mesh network 136.

Hardware Overview

Figure 5:
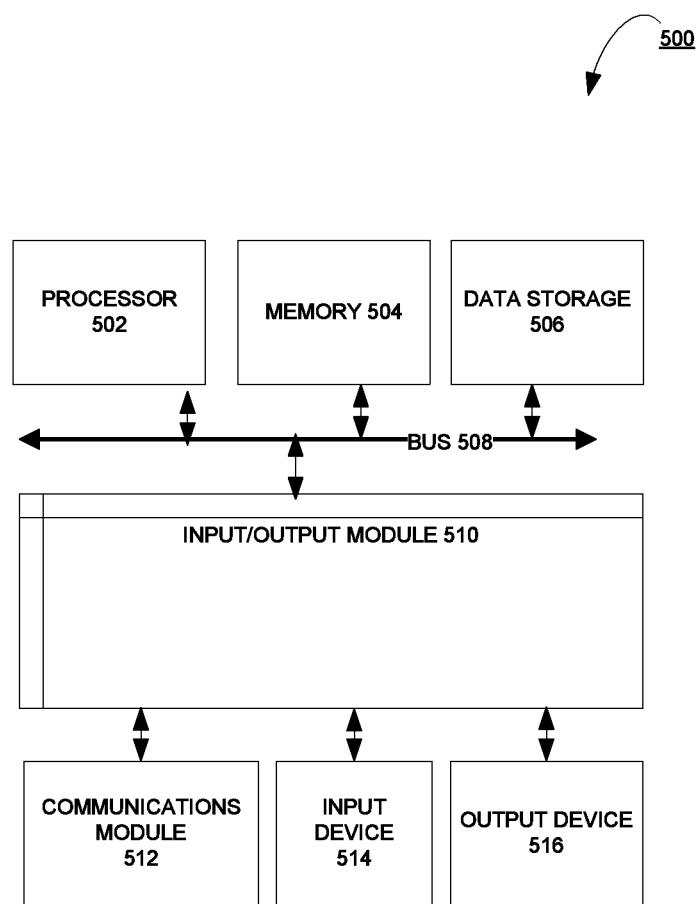
FIG. 5 is a block diagram illustrating an example computer system with which NMS of FIGS. 1A, 1B, 2A, and 2B can be implemented.

FIG. 5 is a block diagram illustrating an example computer system 500 with which NMS 110 of FIGS. 1A, 1B, 2A, and 2B can be implemented. In certain aspects, the computer system 500 may be implemented using hardware or a combination of software and hardware, either in a dedicated server, or integrated into another entity, or distributed across multiple entities.

Computer system 500 (e.g., NMS 110) includes a bus 508 or other communication mechanism for communicating information, and a processor 502 (e.g., processor 236) coupled with bus 508 for processing information. According to one aspect, the computer system 500 can be a cloud computing server of an IaaS that is able to support PaaS and SaaS services. According to one aspect, the computer system 500 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 500 may be implemented with one or more processors 502. Processor 502 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry. Expansion memory may also be provided and connected to computer system 500 through input/output module 510, which may include, for example, a SIMM (Single In Line Memory Module) card interface. Such expansion memory may provide extra storage space for computer system 500, or may also store applications or other information for computer system 500. Specifically, expansion memory may include instructions to carry out or supplement the processes described above, and may include secure information also. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in the memory 504 and implemented in one or more computer program products, e.g., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, for wired communication in some implementations, or for wireless communication in other implementations, and multiple interfaces may also be used. The input/output module 510 is configured to connect to a communications module 512. Example communications modules 512 (e.g., communication module 238) include networking interface cards, such as Ethernet cards and modems.

The components of the system can be interconnected by any form or medium of digital data communication, e.g., a communication network. The communication network (e.g., WAN 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 512 sends and receives electrical, electromagnetic or optical signals that carry digital data streams representing various types of information. The network link typically provides data communication through one or more networks to other data devices. For example, the network link of the communications module 512 may provide a connection through local network to a host computer or to data equipment operated by an Internet Service Provider (ISP). The ISP in turn provides data communication services through the world wide packet data communication network now commonly referred to as the "Internet". The local network and Internet both use electrical, electromagnetic or optical signals that carry digital data streams. The signals through the various networks and the signals on the network link and through communications module 512, which carry the digital data to and from computer system 500, are example forms of transmission media.

Computer system 500 can send messages and receive data, including program code, through the network(s), the network link and communications module 512. In the Internet example, a server might transmit a requested code for an application program through Internet, the ISP, the local network and communications module 512. The received code may be executed by processor 502 as it is received, and/or stored in data storage 506 for later execution.

In certain aspects, the input/output module 510 is configured to connect to a plurality of devices, such as an input device 514 and/or an output device 516. Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 516 may comprise appropriate circuitry for driving the output device 516 to present graphical and other information to a user.

According to one aspect of the present disclosure, network management system 110 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 508. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for registering a network device with an entity, the method comprising:
    receiving, by a network management service (NMS) via a wide area network (WAN), a request to register a pending network device with an entity;
    in response to receiving the request to register the pending network device with the entity, determining, by the NMS, whether the pending network device is able to communicate, via a local area network (LAN) associated with the entity, with a registered network device connected to the LAN that is already registered with the entity based on whether the request or an onboarding token is provided by the registered network device to the NMS; and
    in response to at least determining that the pending network device is able to communicate via the LAN with the registered network device, registering, by the NMS, the pending network device with the entity.

2. The computer-implemented method of claim 1,
    wherein the pending network device is connected to the LAN via wired networking;
    wherein determining whether the pending network device is able to communicate via the LAN with the registered network device further comprises:
        transmitting, by the NMS, a first onboarding token to the pending network device,
        receiving, by the NMS, the onboarding token from the registered network device, and
        determining, by the NMS, whether the onboarding token matches the first onboarding token; and
    wherein in response to at least determining that the pending network device is able to communicate via the LAN with the registered network device, registering the pending network device with the entity further comprises: in response to at least determining that the onboarding token matches the first onboarding token, registering, by the NMS, the pending network device with the entity.

3. The computer-implemented method of claim 2, further comprising:
    receiving, by the NMS via the WAN, a second request to register the pending network device with the entity, wherein the request to register the pending network device with the entity comprises a first request to register the pending network device with the entity; and
    in response to associating the pending network device with the entity and in response to receiving the second request to register the pending network device with the entity, sending, by the NMS to the pending network device, instructions for accessing a device gateway of the NMS that is associated with the entity.

4. The computer-implemented method of claim 2, wherein registering the pending network device with the entity is further in response to receiving approval from an administrator of the entity to associate the pending network device with the entity.

5. The computer-implemented method of claim 2, further comprising:
    receiving, by the NMS from the registered network device, an indication of an uptime of the pending network device; and
    determining, by the NMS, whether the uptime of the pending network device is within a valid range;
    wherein registering the pending network device with the entity is further in response to determining that the uptime of the pending network device is within the valid range.

6. The computer-implemented method of claim 1, further comprising:
    transmitting, by the NMS, instructions to the registered network device to create an open wireless mesh network;
    wherein determining whether the pending network device is able to communicate via the LAN with the registered network device further comprises: determining, by the NMS, whether the pending network device is able to wirelessly connect to the open wireless mesh network created by the registered network device; and
    wherein in response to determining at least that the pending network device is able to communicate via the LAN with the registered network device, registering the pending network device with the entity further comprises: in response to determining at least that the pending network device is able to wirelessly connect to the open wireless mesh network created by the registered network device, registering, by the NMS, the pending network device with the entity.

7. The computer-implemented method of claim 6,
    wherein the request to register the pending network device with the entity includes a wireless mesh network identifier;
    wherein determining whether the pending network device is able to wirelessly connect to the open wireless mesh network created by the registered network device comprises:
        determining, by the NMS, whether the wireless mesh network identifier included in the request to register the pending network device matches a wireless mesh network identifier associated with the open wireless mesh network created by the registered network device; and
in response to determining that the wireless mesh network identifier included in the request to register the pending network device matches the wireless mesh network identifier associated with the open wireless mesh network created by the registered network device, determining, by the NMS, that the pending network device is able to wirelessly connect to the open wireless mesh network created by the registered network device.

8. The computer-implemented method of claim 6, wherein registering the pending network device with the entity further comprises:
transmitting, by the NMS to the pending network device, information for connecting to a secure wireless mesh network created by the registered network device;
wherein the pending network device is able to connect to a device gateway of the NMS via the secure wireless mesh network, and
wherein the information for connecting to the secure wireless mesh network created by the registered network device includes authentication credentials for authenticating the pending network device with the secure wireless mesh network.

9. The computer-implemented method of claim 6, wherein transmitting the instructions to the registered network device to create an open wireless mesh network is in response to receiving, by the NMS from an administrator of the entity, an authorization message to authorize registration of network devices with the entity via wireless mesh networking.

10. The computer-implemented method of claim 6, further comprising:
in response to at least registering the pending network device with the entity, transmitting, by the NMS to the registered network device, instructions to stop providing the open wireless mesh network.

11. A network management system for registering a network device with an entity, comprising:
a memory comprising instructions; and
a processor configured to execute the instructions which, when executed, cause the processor to:
receive, via a wide area network (WAN), a request to register a pending network device with an entity;
in response to receiving the request to register the pending network device with the entity, determine whether the pending network device is able to communicate, via a local area network (LAN) associated with the entity, with a registered network device connected to the LAN that is already registered with the entity based on whether the request or an onboarding token is provided by the registered network device to the NMS; and
in response to at least determining that the pending network device is able to communicate via the LAN with the registered network device, register the pending network device with the entity.

12. The network management system of claim 11, wherein the pending network device is connected to the LAN via wired networking;
wherein the instructions which, when executed, cause the processor to determine whether the pending network device is able to communicate via the LAN with the registered network device further cause the processor to:

transmit a first onboarding token to the pending network device,
receive the onboarding token from the registered network device, and
determine whether the onboarding token matches the first onboarding token; and
wherein the instructions which, when executed, cause the processor to, in response to at least determining that the pending network device is able to communicate via the LAN with the registered network device, register the pending network device with the entity, further cause the processor to: in response to at least determining that the onboarding token matches the first onboarding token, register the pending network device with the entity.

13. The network management system of claim 12, wherein the instructions, when executed, further cause the processor to:
receive, via the WAN, a second request to register the pending network device with the entity, wherein the request to register the pending network device with the entity comprises a first request to register the pending network device with the entity; and
in response to associating the pending network device with the entity and in response to receiving the second request to register the pending network device with the entity, transmit, to the pending network device, instructions for accessing a device gateway that is associated with the entity.

14. The network management system of claim 12, wherein registering the pending network device with the entity is further in response to receiving approval from an administrator of the entity to register the pending network device with the entity.

15. The network management system of claim 12,
wherein the instructions, when executed, further cause the processor to:
receive, from the registered network device, an indication of an uptime of the pending network device, and
determine whether the uptime of the pending network device is within a valid range; and
wherein registering the pending network device with the entity is further in response to determining that the uptime of the pending network device is within the valid range.

16. The network management system of claim 11,
wherein the instructions, when executed, further cause the processor to transmit instructions to the registered network device to create an open wireless mesh network;
wherein the instructions which, when executed, cause the processor to determine whether the pending network device is able to communicate via the LAN with the registered network device further cause the processor to: determine whether the pending network device is able to wirelessly connect to the open wireless mesh network created by the registered network device; and
wherein the instructions which, when executed, cause the processor to, in response to at least determining that the pending network device is able to communicate via the LAN with the registered network device, register the pending network device with the entity, further cause the processor to: in response to determining at least that the pending network device is able to wirelessly connect to the open wireless mesh network created by the registered network device, register the pending network device with the entity.

17. The network management system of claim 16,
wherein the request to register the pending network device with the entity includes a wireless mesh network identifier;
wherein the instructions which, when executed, cause the processor to determine whether the pending network device is able to wirelessly connect to the open wireless mesh network created by the registered network device further cause the processor to:
  determine whether the wireless mesh network identifier included in the request to register the pending network device matches a wireless mesh network identifier associated with the open wireless mesh network created by the registered network device; and
  in response to determining that the wireless mesh network identifier included in the request to register the pending network device matches the wireless mesh network identifier associated with the open wireless mesh network created by the registered network device, determine that the pending network device is able to wirelessly connect to the open wireless mesh network created by the registered network device.

18. The network management system of claim 16,
wherein the instructions which, when executed, cause the processor to register the pending network device with the entity further cause the processor to transmit, to the pending network device, information for connecting to a secure wireless mesh network created by the registered network device;
wherein the pending network device is able to connect to a device gateway via the secure wireless mesh network, and
wherein the information for connecting to the secure wireless mesh network created by the registered network device includes authentication credentials for authenticating the pending network device with the secure wireless mesh network.

19. The network management system of claim 16, wherein the instructions which, when executed, cause the processor to transmit the instructions to the registered network device to create an open wireless mesh network is in response to receiving, from an administrator of the entity, an authorization message to authorize registration of network devices with the entity via wireless mesh networking.

20. A non-transitory machine-readable storage medium comprising machine-readable instructions for causing a processor of a network management system to execute a method for registering a network device with an entity, comprising:
  receiving, via a wide area network (WAN), a request to register a pending network device with an entity;
  in response to receiving the request to register the pending network device with the entity, determining whether the pending network device is able to communicate, via a local area network (LAN) associated with the entity, with a registered network device connected to the LAN that is already registered with the entity based on whether the request or an onboarding token is provided by the registered network device to the NMS; and
  in response to at least determining that the pending network device is able to communicate via the LAN with the registered network device, registering the pending network device with the entity.

* * * * *